(12) United States Patent
Tsai

(10) Patent No.: US 12,296,914 B1
(45) Date of Patent: May 13, 2025

(54) COMFORTABLE AND PRESSURE-REDUCING HANDLE GRIP

(71) Applicant: Foming Bicycle Parts Co., Ltd., Fuxing Township (TW)

(72) Inventor: Shang-Tsang Tsai, Fuxing Township (TW)

(73) Assignee: Foming Bicycle Parts Co., Ltd., Fuxing Township (TW)

(*) Notice: Subject to any disclaimer, the term of this patent is extended or adjusted under 35 U.S.C. 154(b) by 0 days.

(21) Appl. No.: 18/611,890

(22) Filed: Mar. 21, 2024

(51) Int. Cl.
*B62K 21/26* (2006.01)

(52) U.S. Cl.
CPC .................................. *B62K 21/26* (2013.01)

(58) Field of Classification Search
CPC ........................................................ B62K 21/26
USPC .......................................................... 74/551.9
See application file for complete search history.

(56) References Cited

U.S. PATENT DOCUMENTS

| | | | | |
|---|---|---|---|---|
| 597,108 | A * | 1/1898 | Elton et al. | B62K 21/26 74/551.9 |
| 3,713,350 | A * | 1/1973 | Brilando | B62K 21/26 74/551.9 |
| 4,843,905 | A * | 7/1989 | Jean | B62J 3/08 74/551.8 |
| 4,941,369 | A * | 7/1990 | Specht | B62J 3/08 74/551.8 |
| 6,105,460 | A * | 8/2000 | Li | B62K 21/26 81/177.1 |
| 11,584,292 | B1 * | 2/2023 | Lin | B62K 21/26 |
| 2007/0089559 | A1 * | 4/2007 | Franc | B62K 21/125 74/551.1 |
| 2010/0089196 | A1 * | 4/2010 | Losio | B62K 21/26 74/551.9 |
| 2011/0219909 | A1 * | 9/2011 | Galstad | B62K 21/12 74/551.9 |
| 2013/0104692 | A1 * | 5/2013 | Segato | B62K 21/26 74/551.9 |
| 2014/0260773 | A1 * | 9/2014 | Arnold | B62K 21/26 74/551.9 |
| 2021/0316813 | A1 * | 10/2021 | Krause | B62K 21/26 |

FOREIGN PATENT DOCUMENTS

EP          2881314 A1 *  6/2015   ........... B62K 21/125

OTHER PUBLICATIONS

Translation of EP-2881314-A1, Krause, Jun. 10, 2015 (Year: 2015).*

* cited by examiner

*Primary Examiner* — Vinh Luong
(74) *Attorney, Agent, or Firm* — Demian K. Jackson; Jackson IPG PLLC

(57) ABSTRACT

A comfortable and pressure-reducing handle grip contains a tube and a sleeve. The sleeve includes a first gripping portion and a second gripping portion. The first gripping portion has an internal segment and an external segment. An X axis is defined in forward and backward directions of the second gripping portion, a Y axis is defined in left and right directions of the second gripping portion, and a Z axis is defined in up and down directions. The second gripping portion has a deformation block, and the deformation block has a through hole, an air orifice formed, and an abutting face, such that airs flow through the through hole of the X axis and the air orifice of the Y axis so that the deformation block flexibly deforms along the Z axis to enhance a using comfort and reduce a pressure.

6 Claims, 23 Drawing Sheets

COMFORTABLE AND PRESSURE-REDUCING HANDLE GRIP

TECHNICAL FIELD

The present invention relates to a handle grip of a bicycle, and more particularly to a comfortable and pressure-reducing handle grip.

BACKGROUND

Bicycles are lightweight, energy-saving and carbon-reducing, and have become an increasingly popular tool for transportation, sports and leisure. Therefore, the number of people who like and use bicycles is gradually increasing, and use occasions are becoming more and more extensive.

To facilitate a rider to control balance and direction, a conventional handlebar of a bicycle includes a handle grip on two ends thereof so that the rider holds the handle grip. The handle grip contains an inner shell made of hard plastic, a flexible sleeve made of flexible plastic, and a retainer. The inner shell is hollow and formed in a tube shape, the flexible sleeve is covered on an outer wall of the inner shell to be abutted against by the rider, and the flexible sleeve includes a contact fringe extending from a side thereof, and the retainer is configured to engage the inner shell on the handlebar of the bicycle.

When the handle grip is held by the rider to ride the bicycle, the contact fringe is abutted against the rider. However, the contact fringe is solid to limit a using comfort and the pressure cannot be reduced. In addition, the retainer is exposed outside and has no positioning structure, so the retainer is rotated easily and has a poor appearance and use effect.

The present invention has arisen to mitigate and/or obviate the afore-described disadvantages.

SUMMARY

The primary aspect of the present invention is to provide a comfortable and pressure-reducing handle grip which is used comfortably and is capable of reducing pressure, for example, when using the comfortable and pressure-reducing handle grip, the deformation block is configured to be contacted by the palm of the rider to produce a flexible deformation thus obtaining an auxiliary support, a comfort, and a shock absorption.

To obtain the above-mentioned aspects, a comfortable and pressure-reducing handle grip provided by the present invention contains a tube and a sleeve.

The tube is hollow.

The sleeve is injection molded and configured to cover the outer wall of the tube. The sleeve includes a first gripping portion and a second gripping portion, the first gripping portion has an internal segment and an external segment, and the second gripping portion is located adjacent to a rear side of the external segment of the first gripping portion and is connected with the first gripping portion.

A hardness of the tube is greater than a hardness of the first gripping portion, and the hardness of the first gripping portion is greater than a hardness of the second gripping portion. An X axis is defined in forward and backward directions of the second gripping portion, a Y axis is defined in left and right directions of the second gripping portion, and a Z axis is defined in up and down directions.

The second gripping portion has a deformation block extending along the X axis, the deformation block has a through hole defined along the X axis, and the deformation block has an air orifice formed along the Y axis and communicating with the through hole. The deformation block has an abutting face defined on a top thereof, such that airs flow through the through hole of the X axis and the air orifice of the Y axis so that the deformation block flexibly deforms along the Z axis to enhance a using comfort and reduce a pressure.

DETAILED DESCRIPTION

Figure 1:
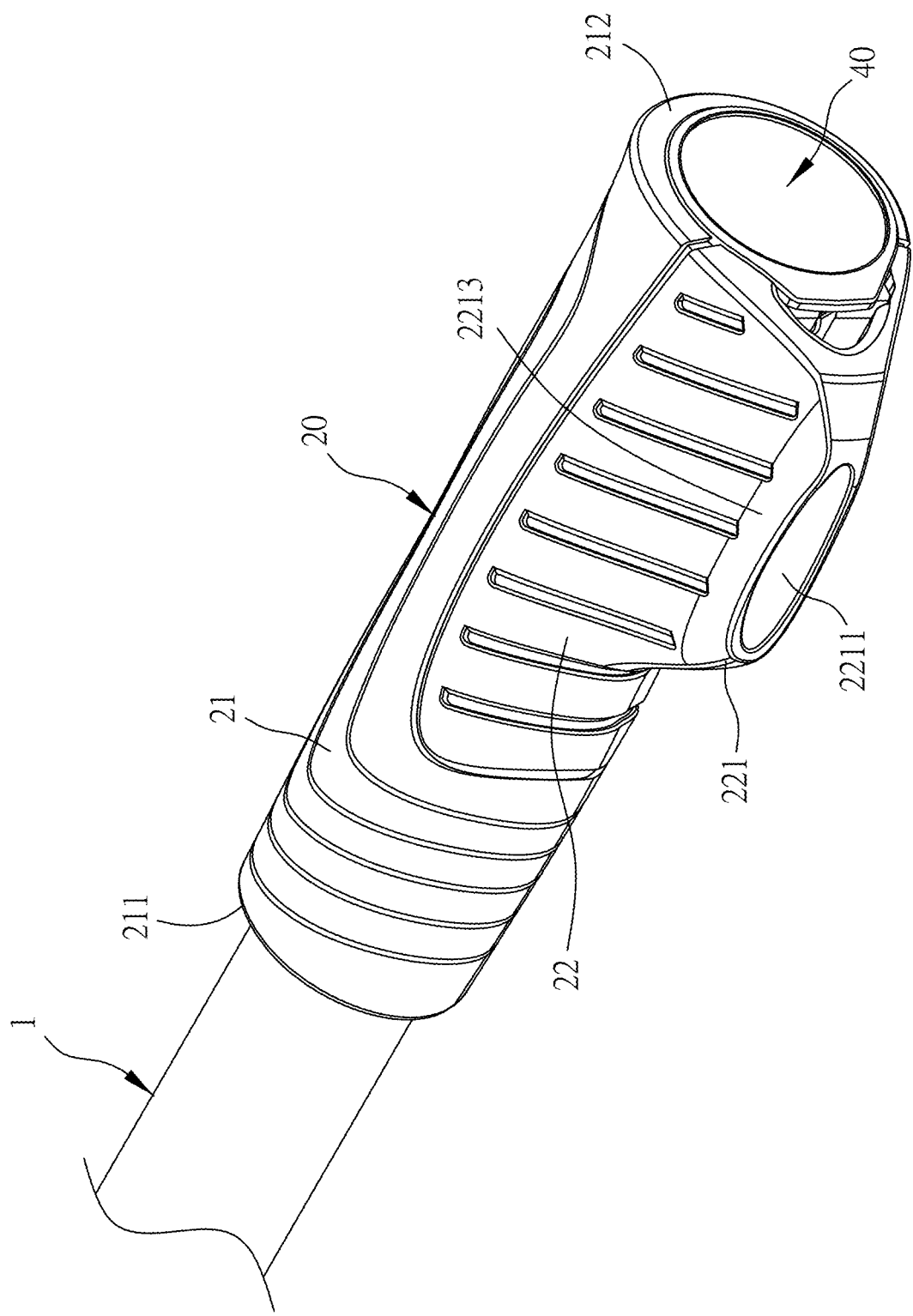
FIG. 1 is a perspective view showing the assembly of a comfortable and pressure-reducing handle grip according to a preferred embodiment of the present invention.
Figure 2:
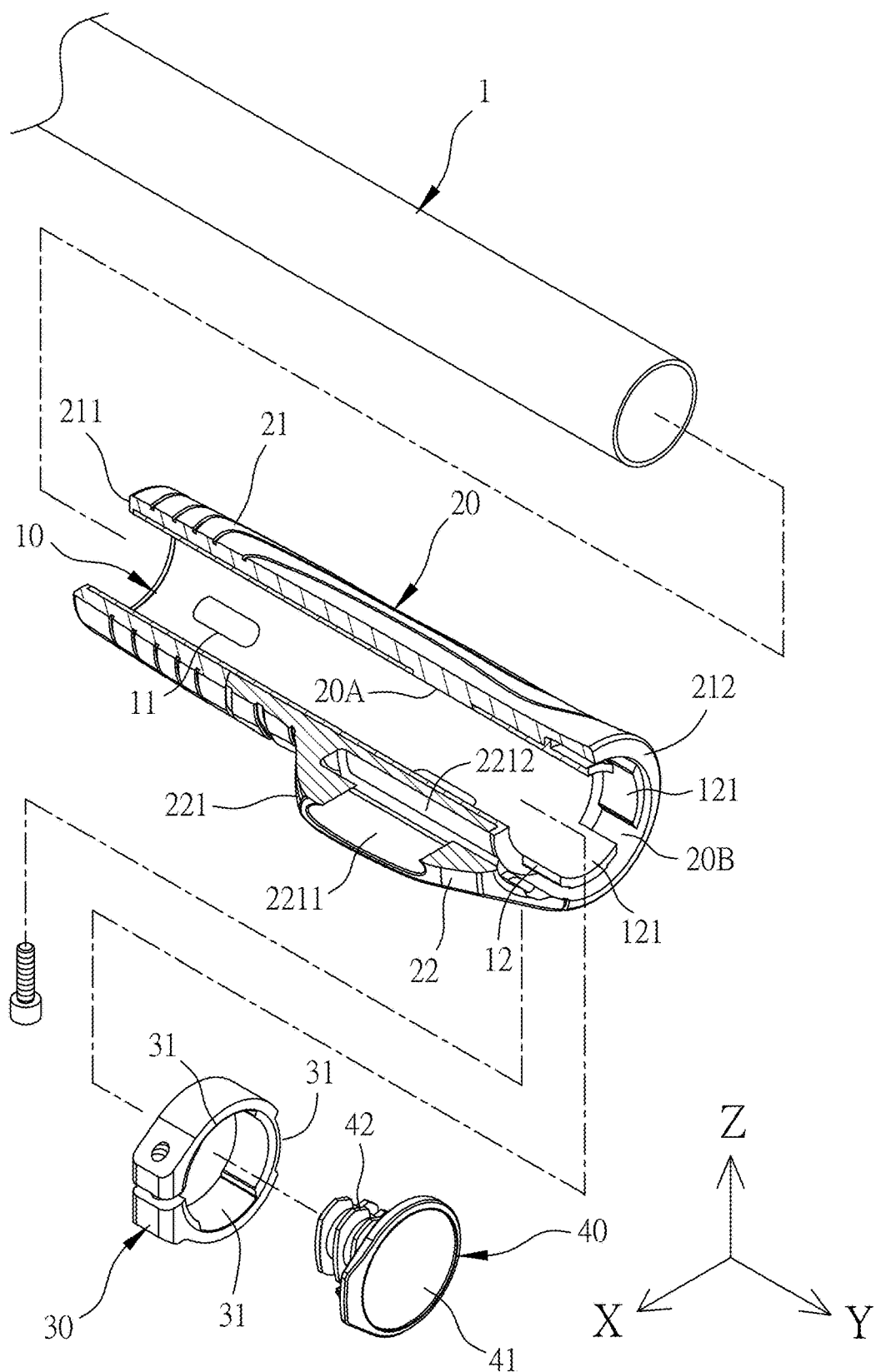
FIG. 2 is a cross-sectional perspective view showing the exploded components of the comfortable and pressure-reducing handle grip according to the preferred embodiment of the present invention.
Figure 3:
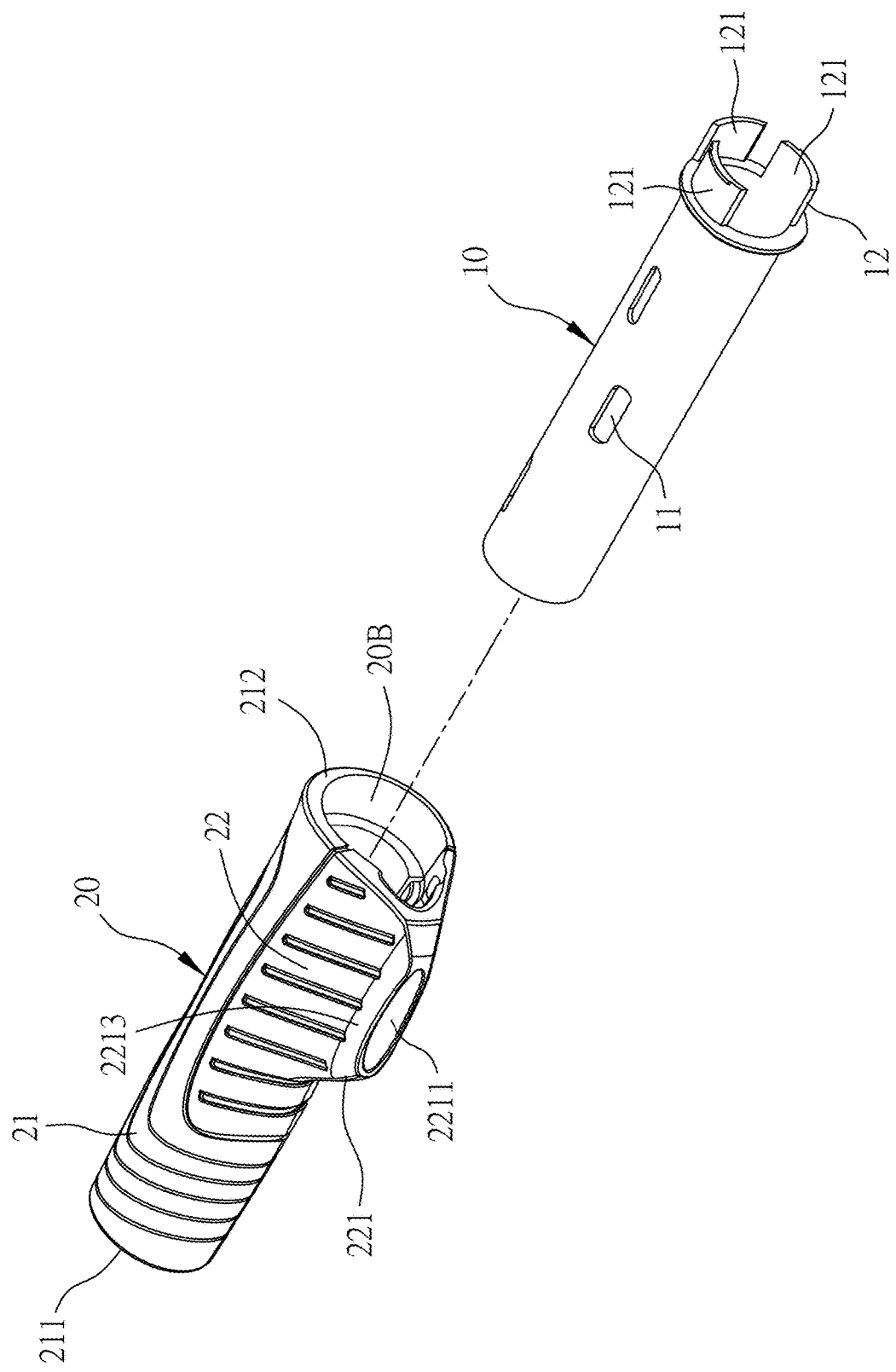
FIG. 3 is a perspective view showing the exploded components of a tube and a sleeve of the comfortable and pressure-reducing handle grip according to the preferred embodiment of the present invention.
Figure 4:
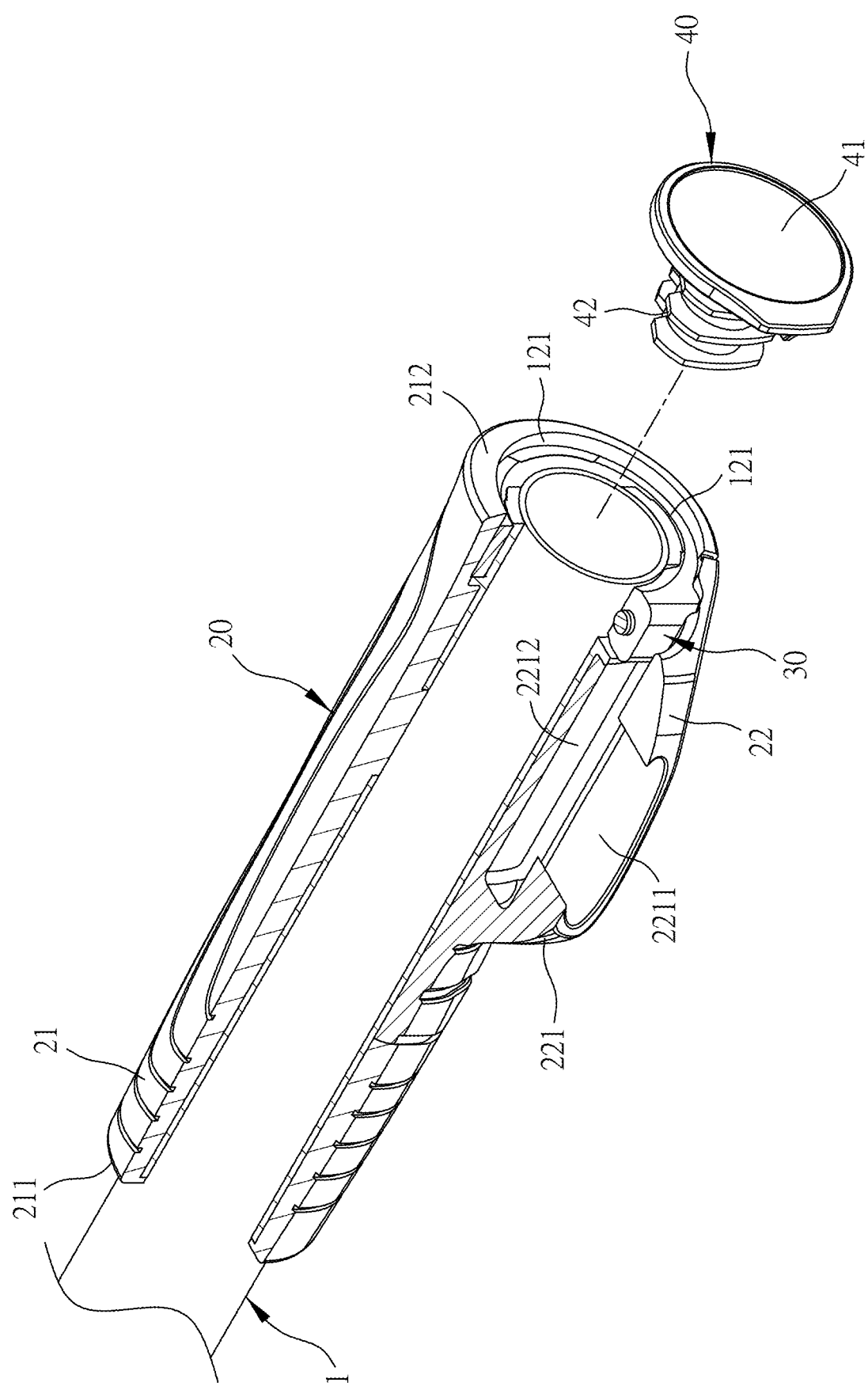
FIG. 4 is another cross-sectional perspective view showing the exploded components of the comfortable and pressure-reducing handle grip according to the preferred embodiment of the present invention.
Figure 5:
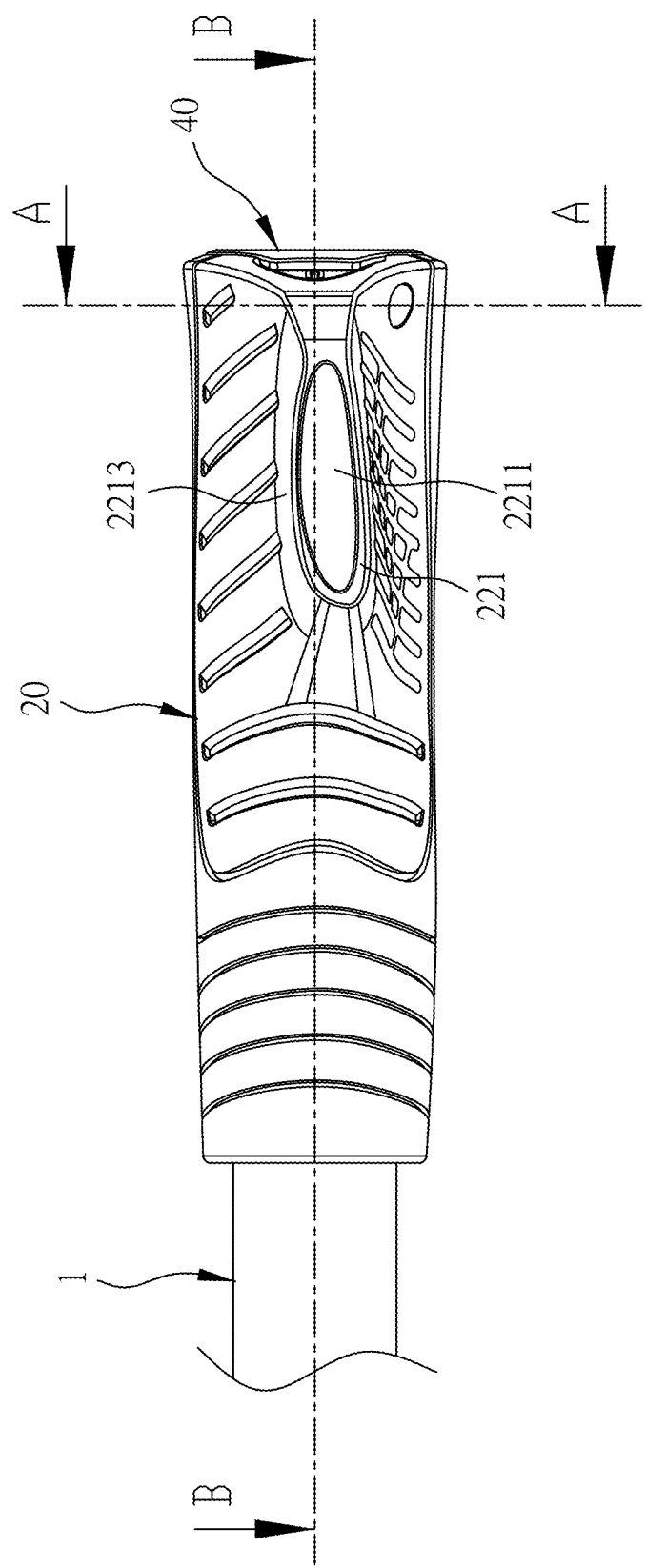
FIG. 5 is a side plan view showing the assembly of the comfortable and pressure-reducing handle grip according to the preferred embodiment of the present invention.
Figure 6:
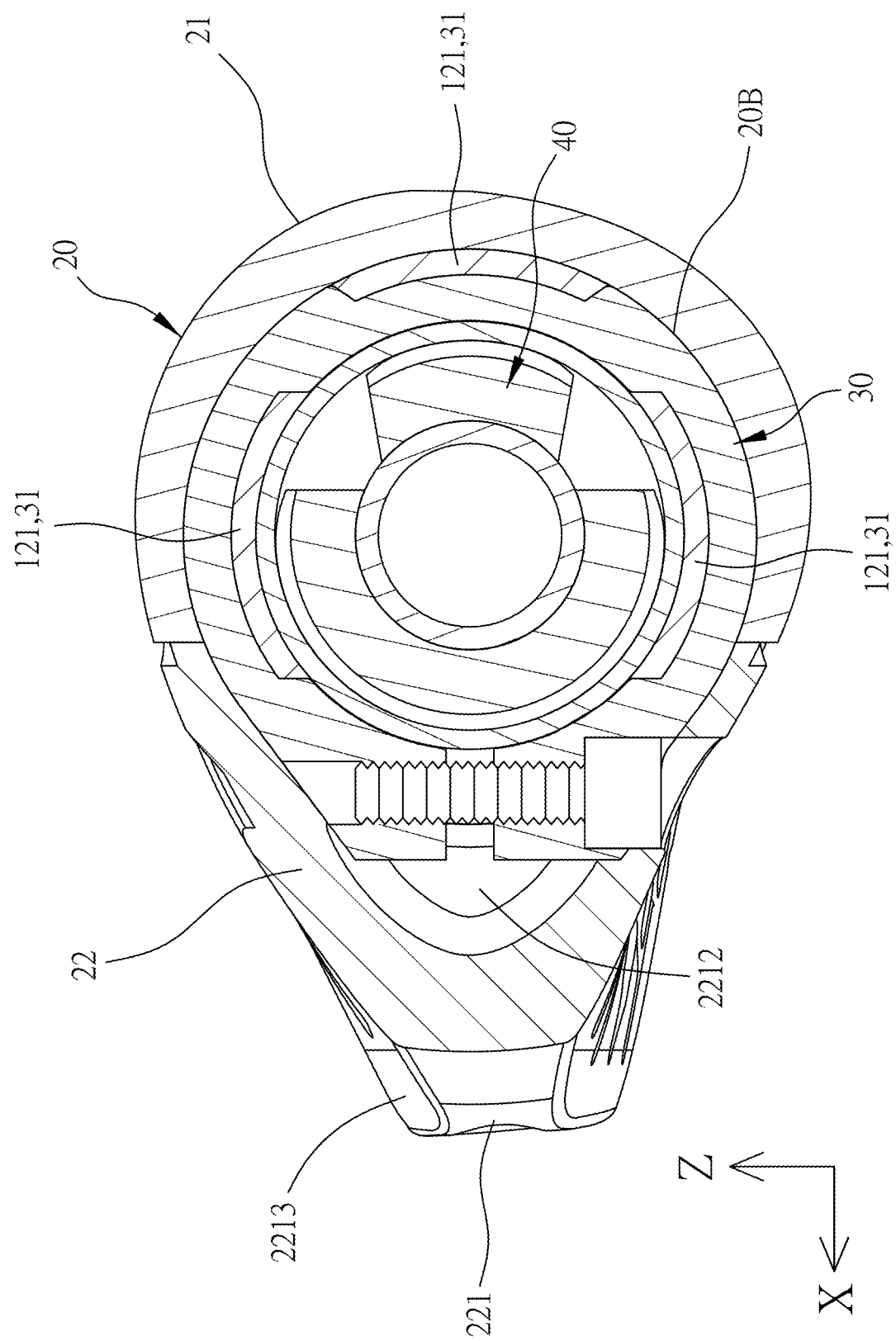
FIG. 6 is a cross-sectional view taken along the line A-A of FIG. 5.
Figure 7:
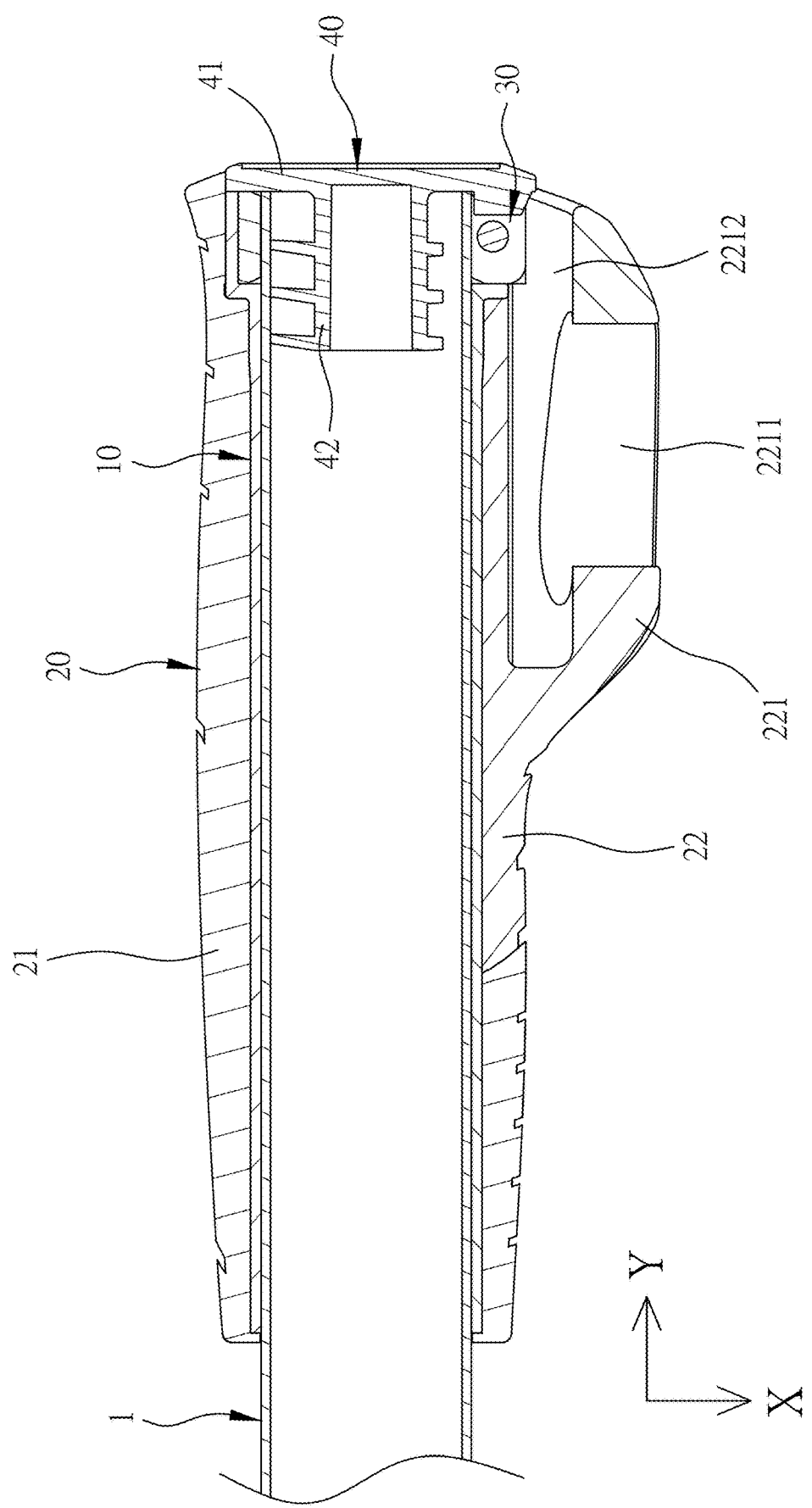
FIG. 7 is a cross-sectional view taken along the line B-B of FIG. 5.

With reference to FIGS. 1-7, a comfortable and pressure-reducing handle grip according to a preferred embodiment of the present invention comprises a tube 10, a sleeve 20, a retainer 30, and a covering element 40.

The tube 10 is hollow, one-piece molded from plastic and configured to fit on a handlebar 1 of a bicycle (not shown), wherein the tube 10 is removable from the handlebar 1 easily and includes multiple receiving orifices 11 defined on an outer wall of the tube 10, and a forced portion 12 formed on an outer end of the tube 10 and having multiple spaced tabs 121.

The sleeve 20 is injection molded and configured to cover the outer wall of the tube 10, and the sleeve 20 includes multiple engagement protrusions 20A formed on an inner wall thereof and engaged in the multiple receiving orifices 11 of the tube 10 to connect the sleeve 20 with the tube 10 securely. The sleeve 20 includes a fitting groove 20B defined on an inner wall thereof and corresponding to the forced portion 12 of the tube 10, wherein the sleeve 20 further includes a first gripping portion 21 and a second gripping portion 22, the first gripping portion 21 has an internal segment 211 and an external segment 212, and the second gripping portion 22 is located adjacent to a rear side of the external segment 212 of the first gripping portion 21 and is connected with the first gripping portion 21. A hardness of the tube 10 is greater than a hardness of the first gripping portion 21, and the hardness of the first gripping portion 21 is greater than a hardness of the second gripping portion 22, wherein an X axis is defined in forward and backward directions of the second gripping portion 22, a Y axis is defined in left and right directions of the second gripping portion 22, and a Z axis is defined in up and down directions. The second gripping portion 22 has a deformation block 221 extending along the X axis, the deformation block 221 has a through hole 2211 defined along the X axis, and the deformation block 221 has an air orifice 2212 formed along the Y axis and communicating with the through hole 2211. In addition, the deformation block 221 has an abutting face 2213 defined on a top thereof. In this embodiment, the through hole 2211 is elongatedly circular.

The retainer 30 includes multiple fixing recesses 31 defined on an inner surface and an outer surface thereof, and the retainer 30 is fitted in the fitting groove 20B of the sleeve 20 and on the forced portion 12 of the tube 10 to retain the tube 10 on the handlebar 1, and the multiple fixing recesses 31 of the retainer 30 are engaged with the multiple spaced tabs 121 of the tube 10 to avoid an offset when the retainer 30 rotates.

The covering element 40 includes a cap 41 and an engagement portion 42 configured to engage with an inner wall of the handlebar 1, wherein the cap 41 is covered on the fitting groove 20B of the sleeve 20 to accommodate the retainer 30 in the sleeve 20.

Figure 8:
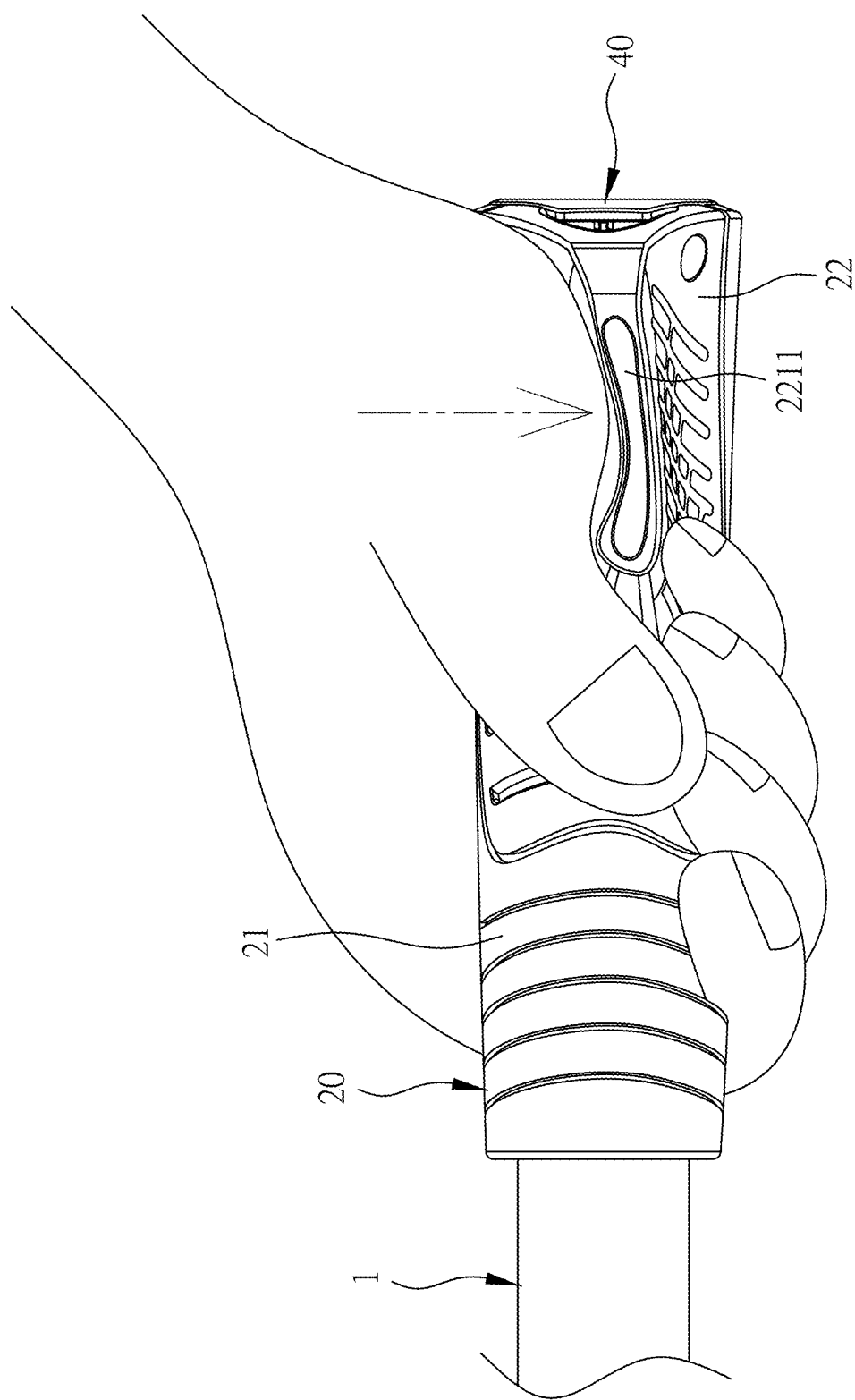
FIG. 8 is a side plan view showing the operation of the comfortable and pressure-reducing handle grip according to the preferred embodiment of the present invention.
Figure 9:
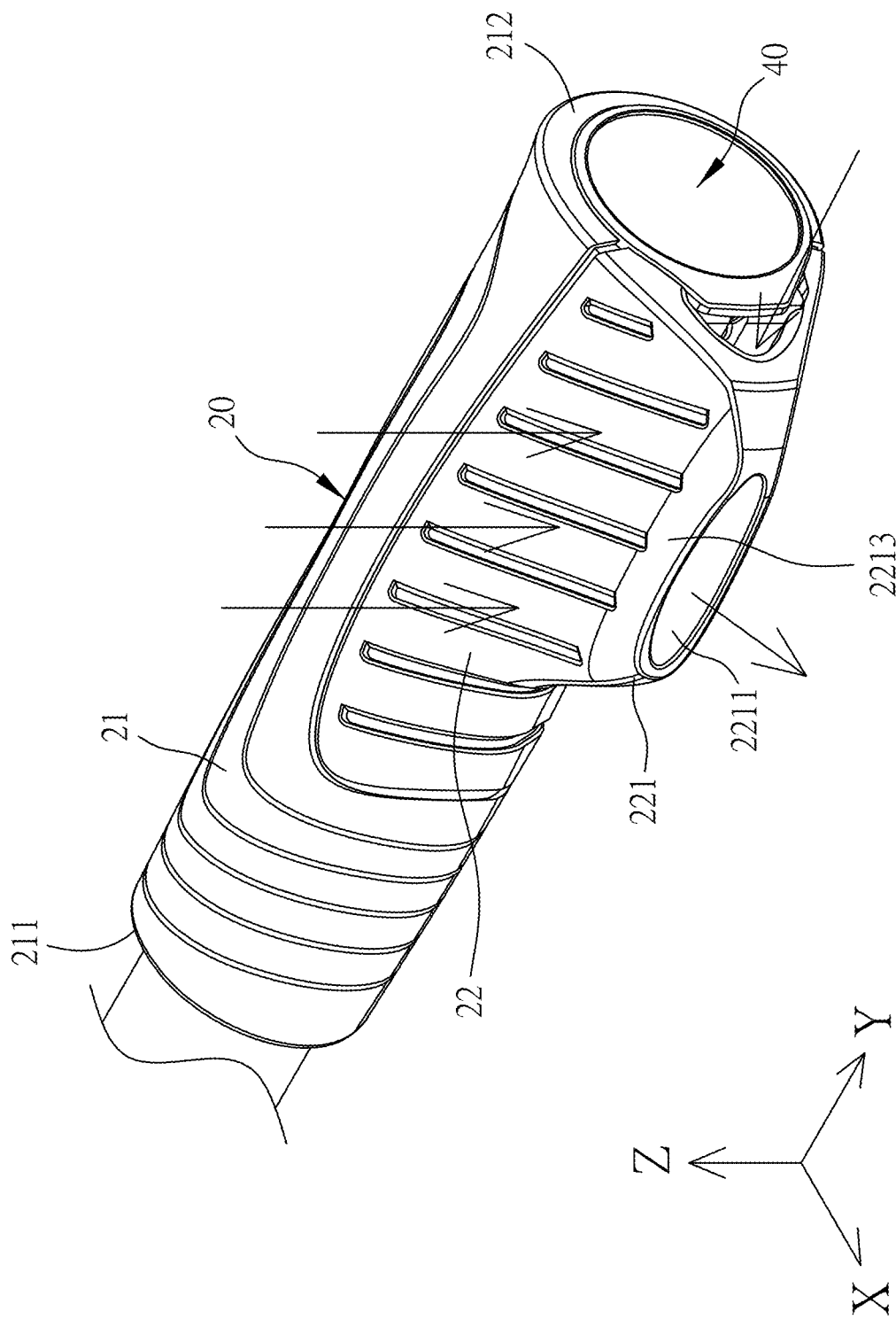
FIG. 9 is a perspective view showing the operation of the comfortable and pressure-reducing handle grip according to the preferred embodiment of the present invention.
Figure 10:
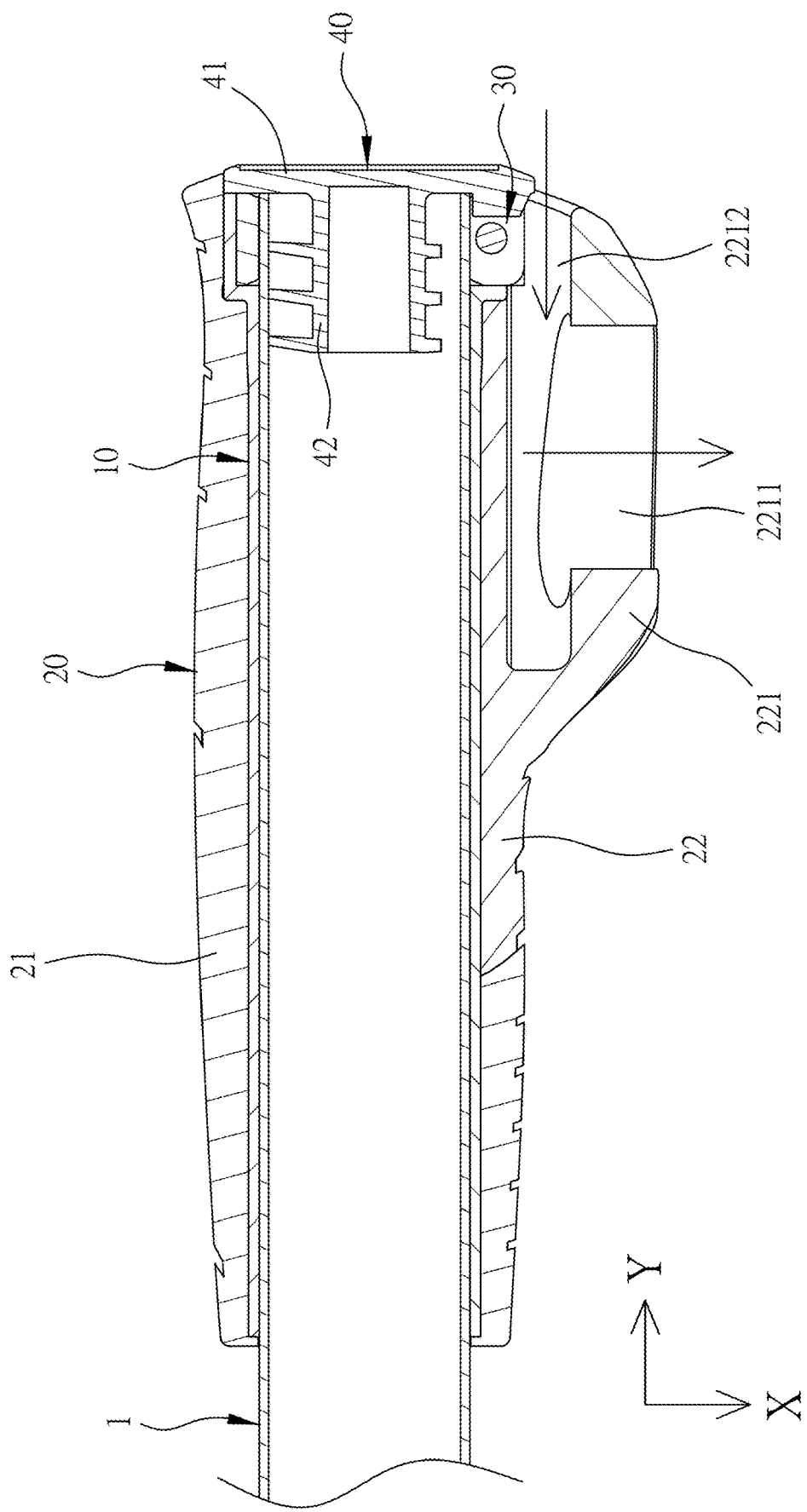
FIG. 10 is a side plan view showing the operation of the comfortable and pressure-reducing handle grip according to the preferred embodiment of the present invention.

In use, as shown in FIGS. 8-10, the sleeve 20 is held by a rider, and the abutting face 2213 of the deformation block 221 is contacted by a palm of the rider, wherein airs flow through the through hole 2211 of the X axis and the air orifice 2212 of the Y axis so that the deformation block 221 flexibly deforms along the Z axis to enhance a using comfort and reduce pressure.

Figure 11:
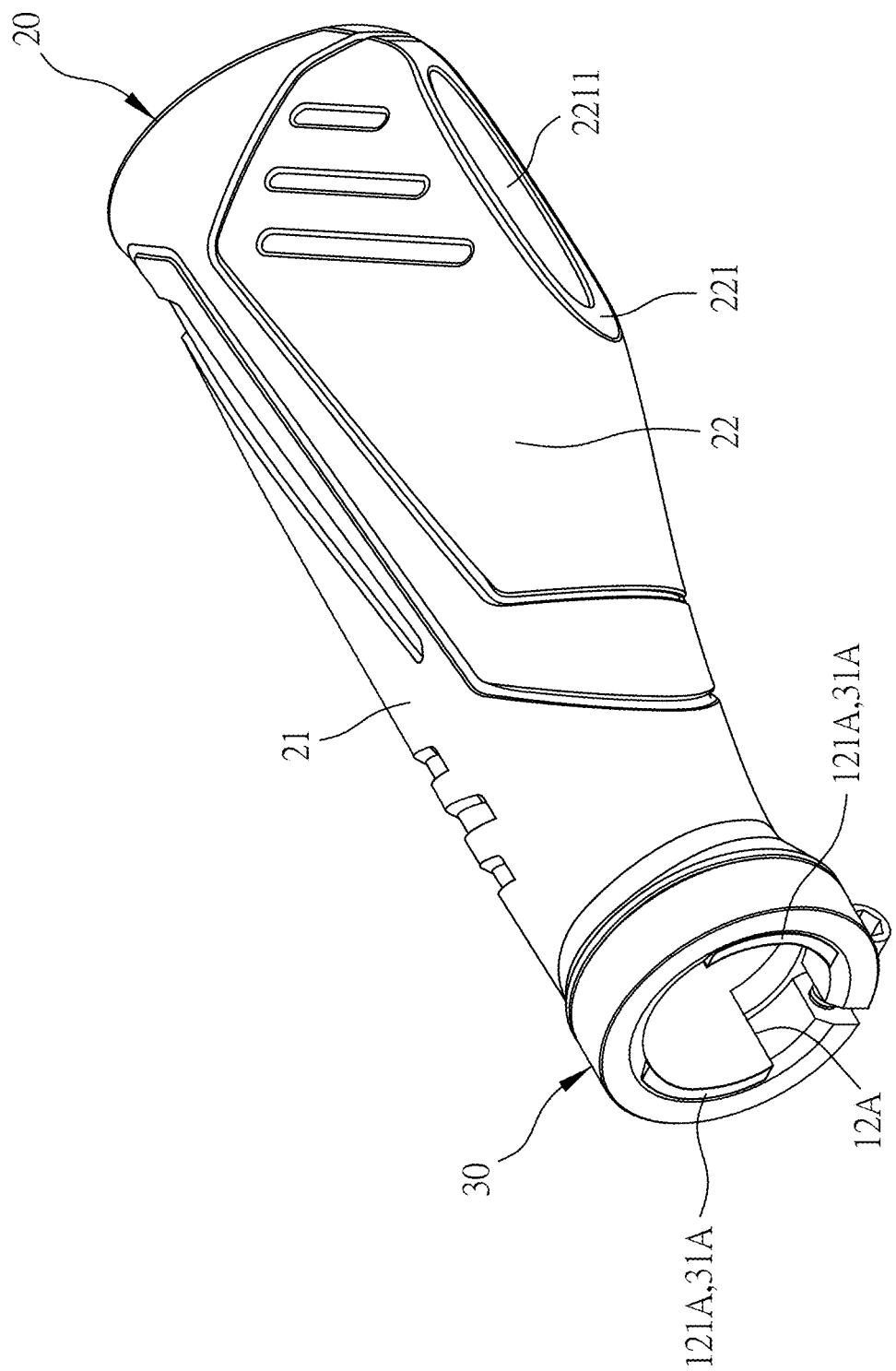
FIG. 11 is a perspective view showing the assembly of a comfortable and pressure-reducing handle grip according to another preferred embodiment of the present invention.
Figure 12:
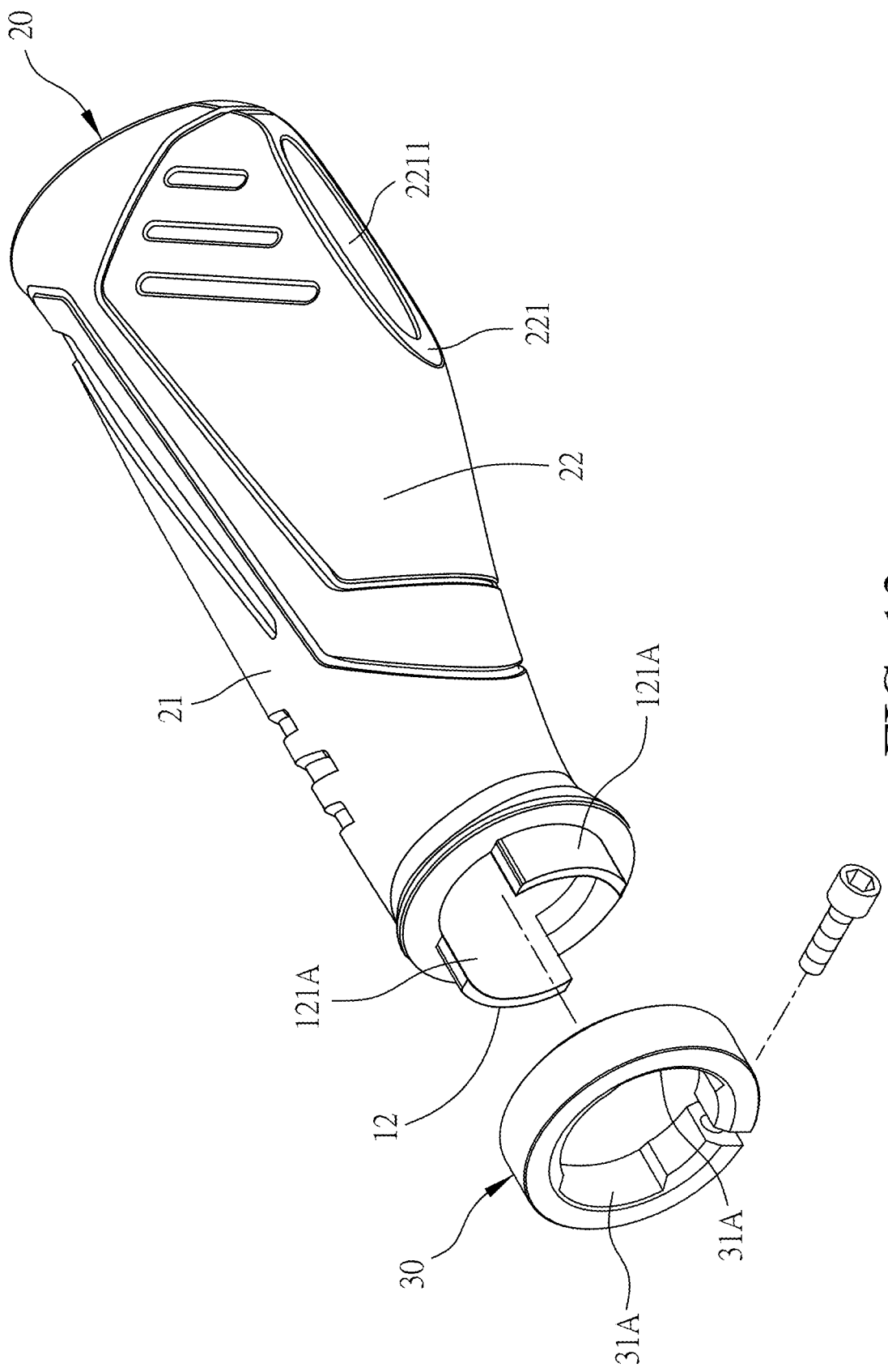
FIG. 12 is a perspective view showing the exploded components of the comfortable and pressure-reducing handle grip according to another preferred embodiment of the present invention.

As illustrated in FIGS. 11 and 12, in another embodiment, the tube 10 includes a forced portion 12A formed on an inner end thereof and has multiple spaced tabs 121A, wherein the sleeve 20 is injection molded to covet an outer surface of the tube 10, and the forced portion 12A of the tube 10 extends out of the sleeve 20. The retainer 30 includes multiple fixing recesses 31A defined on an inner surface thereof, the retainer 30 is fitted on the forced portion 12A of the tube 10 so as to retain the tube 10 on the handlebar 1, and the multiple fixing recesses 31A of the retainer 30 are engaged with the multiple spaced tabs 121A of the tube 10 to avoid a rotation of the retainer 30.

Figure 13:
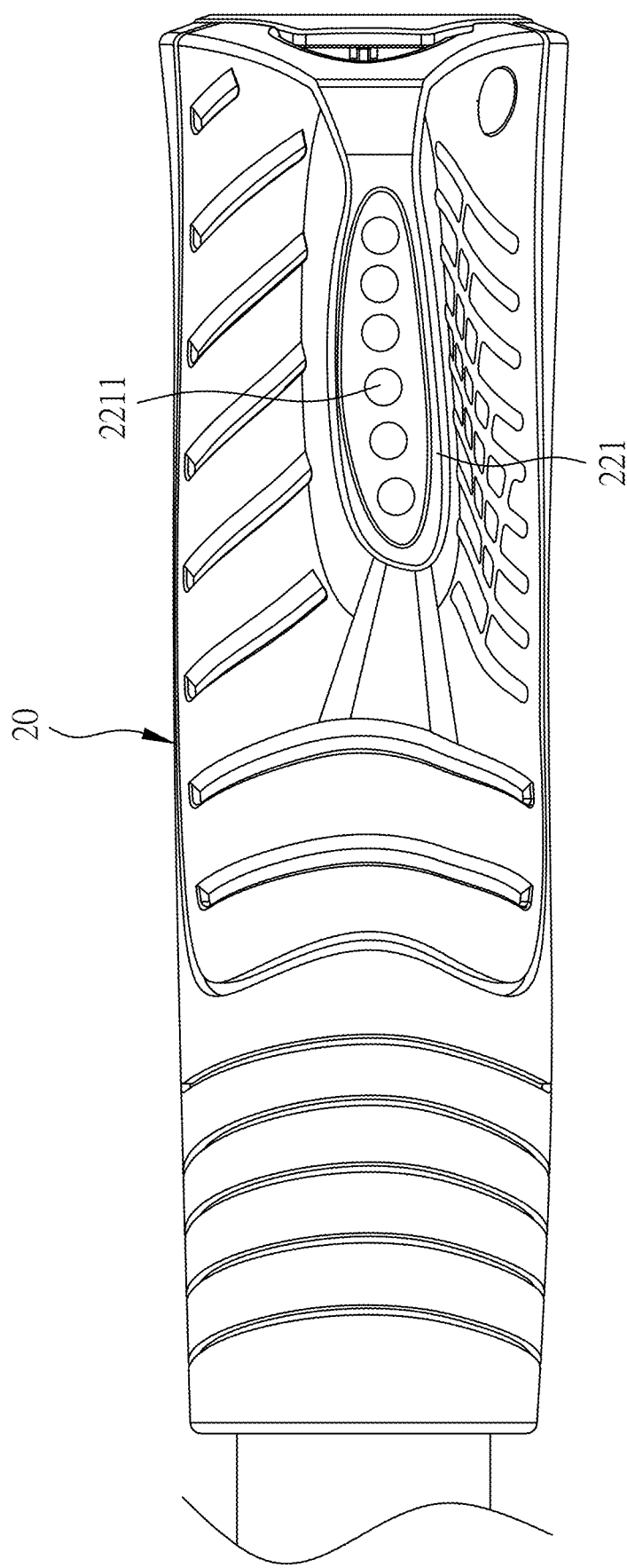
FIG. 13 is a side plan view showing the assembly of a through hole of a comfortable and pressure-reducing handle grip according to another preferred embodiment of the present invention.
Figure 14:
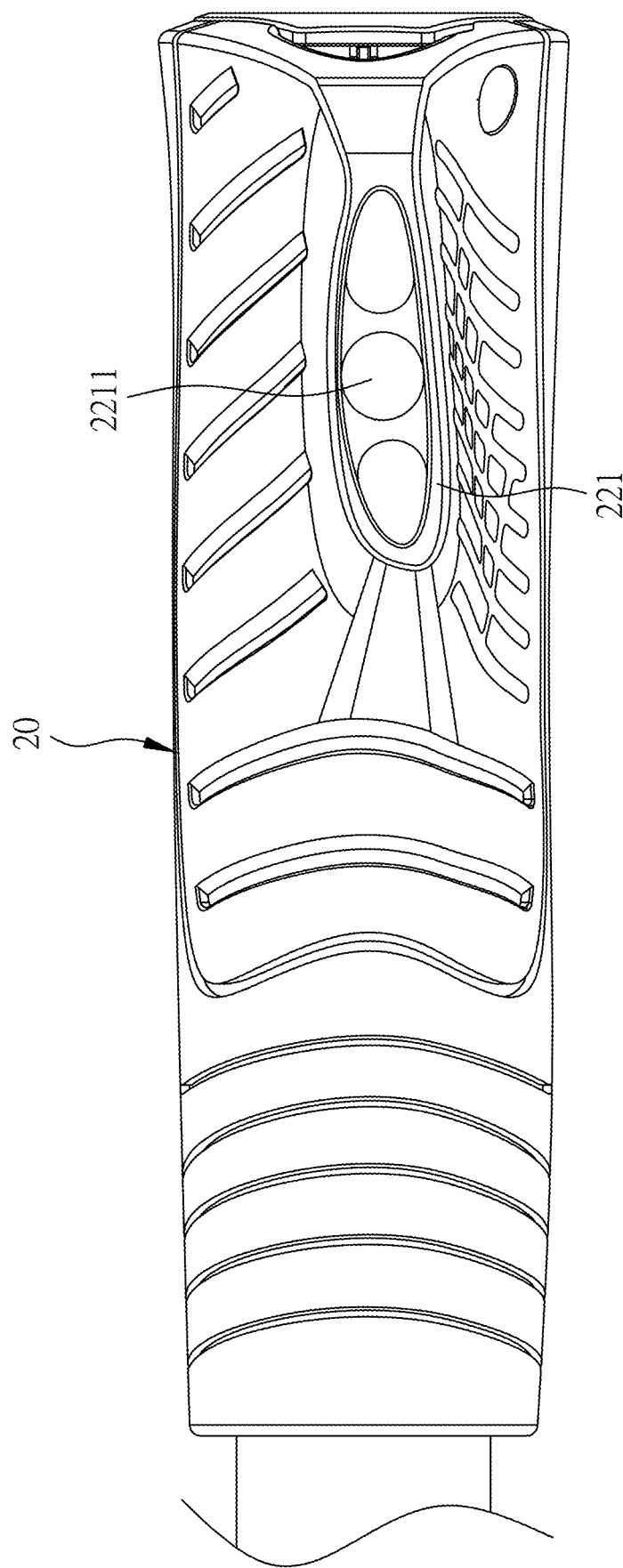
FIG. 14 is a side plan view showing the assembly of a through hole of a comfortable and pressure-reducing handle grip according to another preferred embodiment of the present invention.
Figure 15:
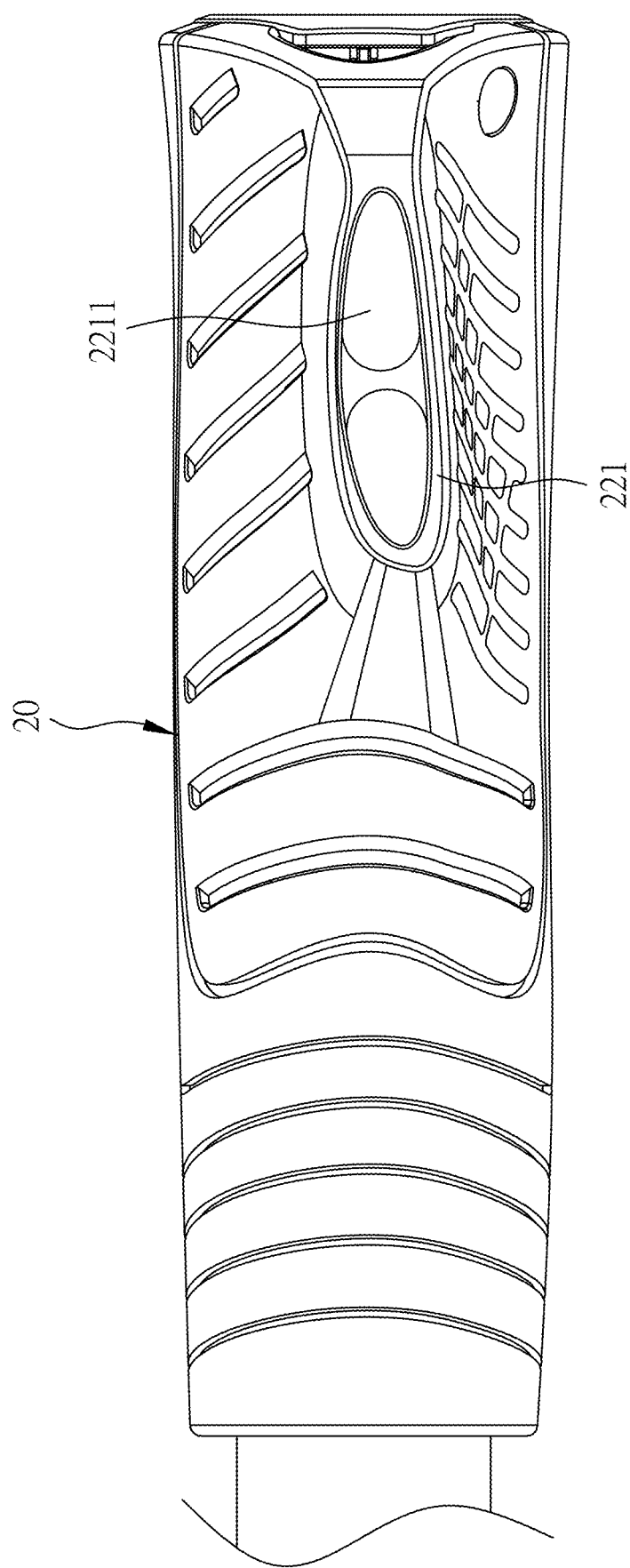
FIG. 15 is a side plan view showing the assembly of a through hole of a comfortable and pressure-reducing handle grip according to another preferred embodiment of the present invention.
Figure 16:
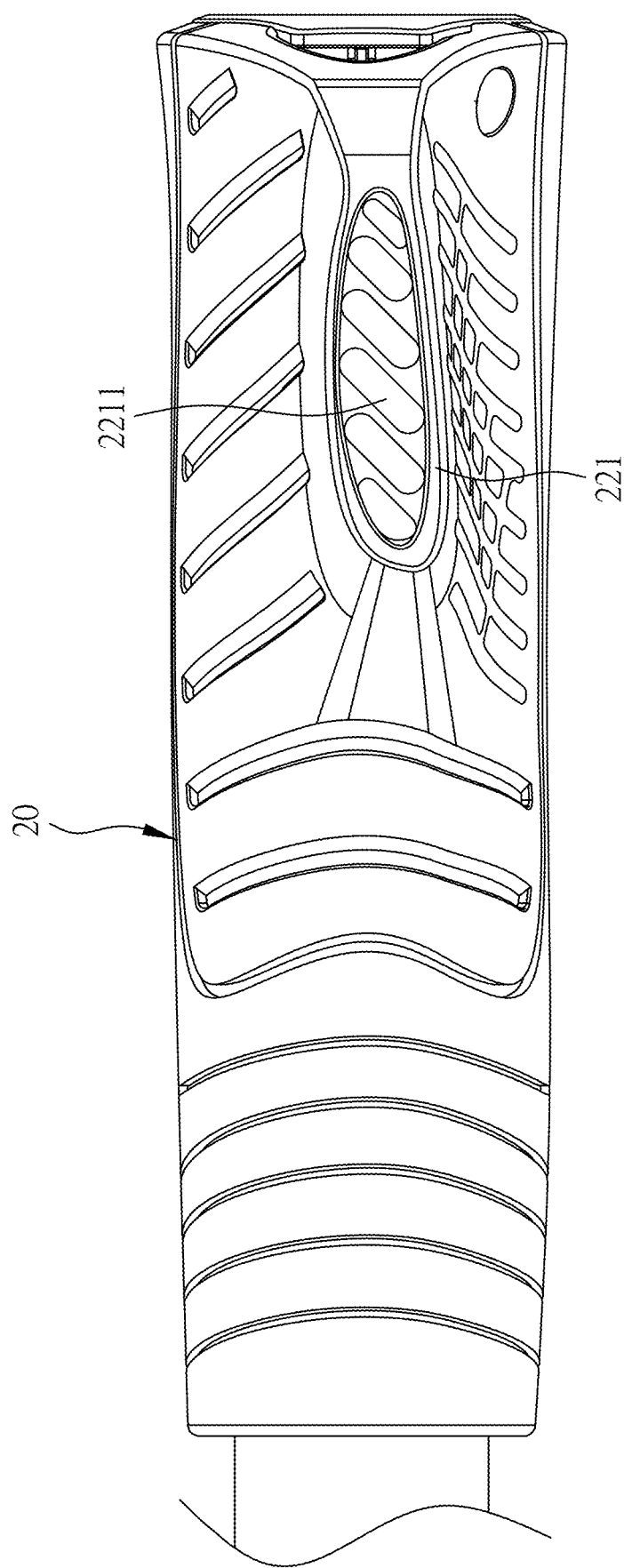
FIG. 16 is a side plan view showing the assembly of a through hole of a comfortable and pressure-reducing handle grip according to another preferred embodiment of the present invention.
Figure 17:
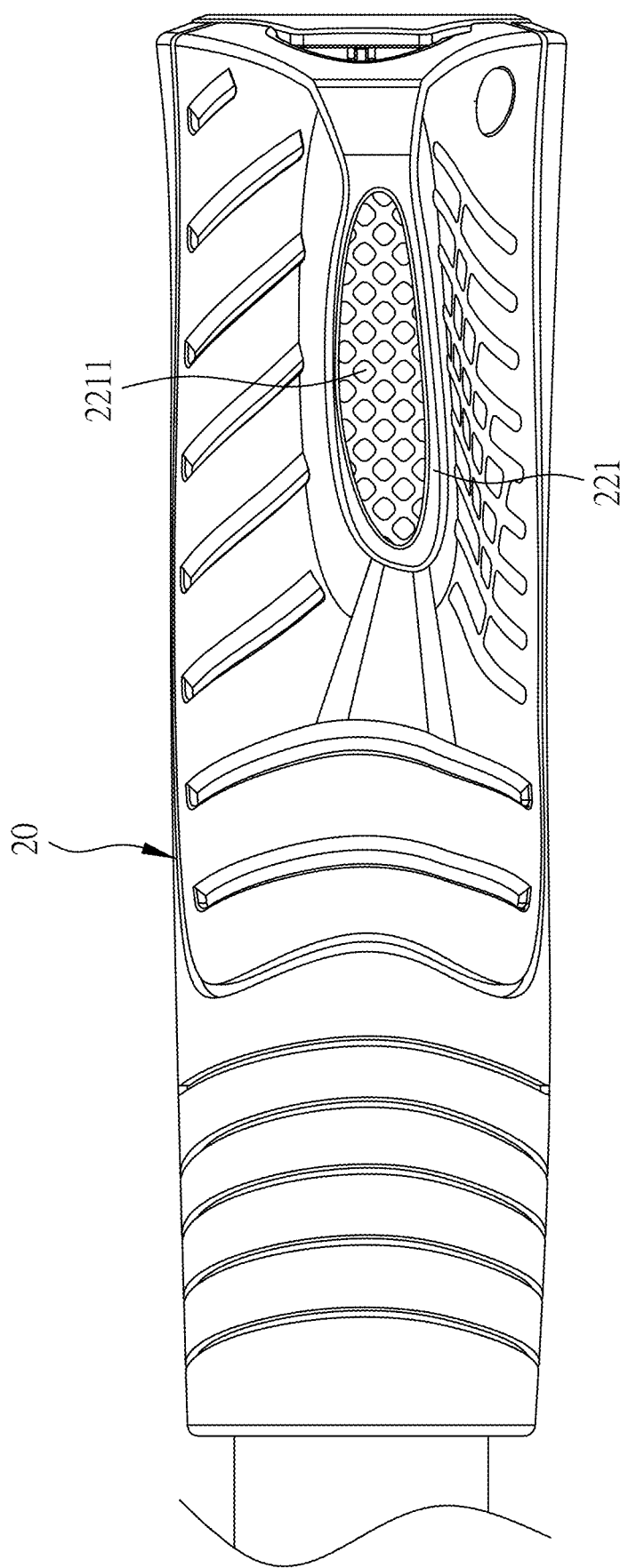
FIG. 17 is a side plan view showing the assembly of a through hole of a comfortable and pressure-reducing handle grip according to another preferred embodiment of the present invention.
Figure 18:
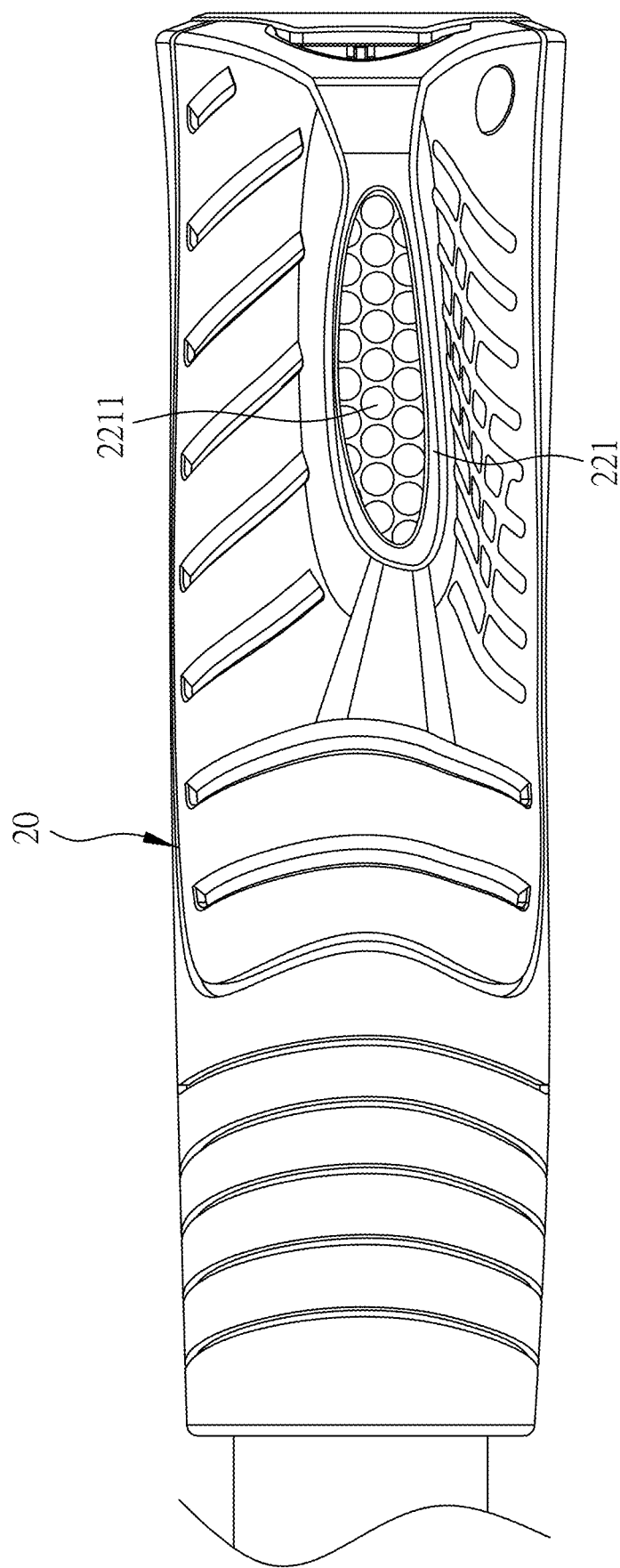
FIG. 18 is a side plan view showing the assembly of a through hole of a comfortable and pressure-reducing handle grip according to another preferred embodiment of the present invention.
Figure 19:
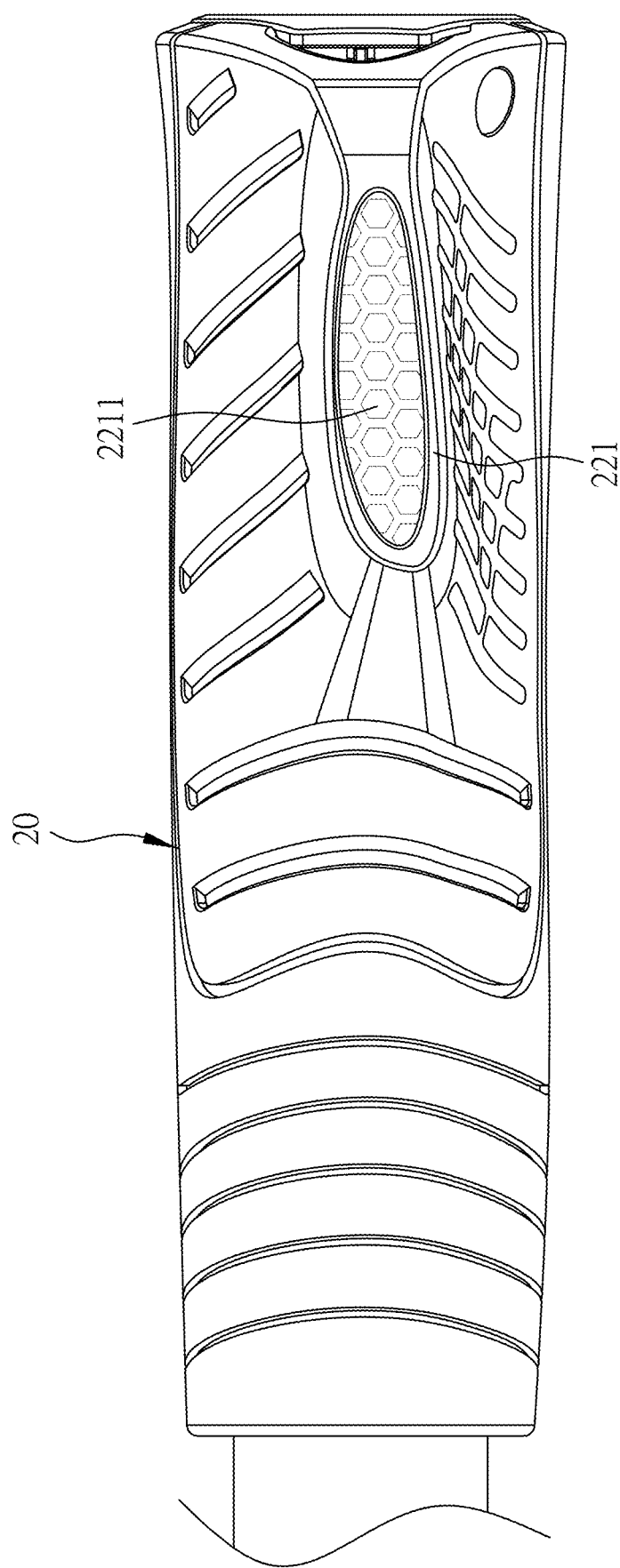
FIG. 19 is a side plan view showing the assembly of a through hole of a comfortable and pressure-reducing handle grip according to another preferred embodiment of the present invention.
Figure 20:
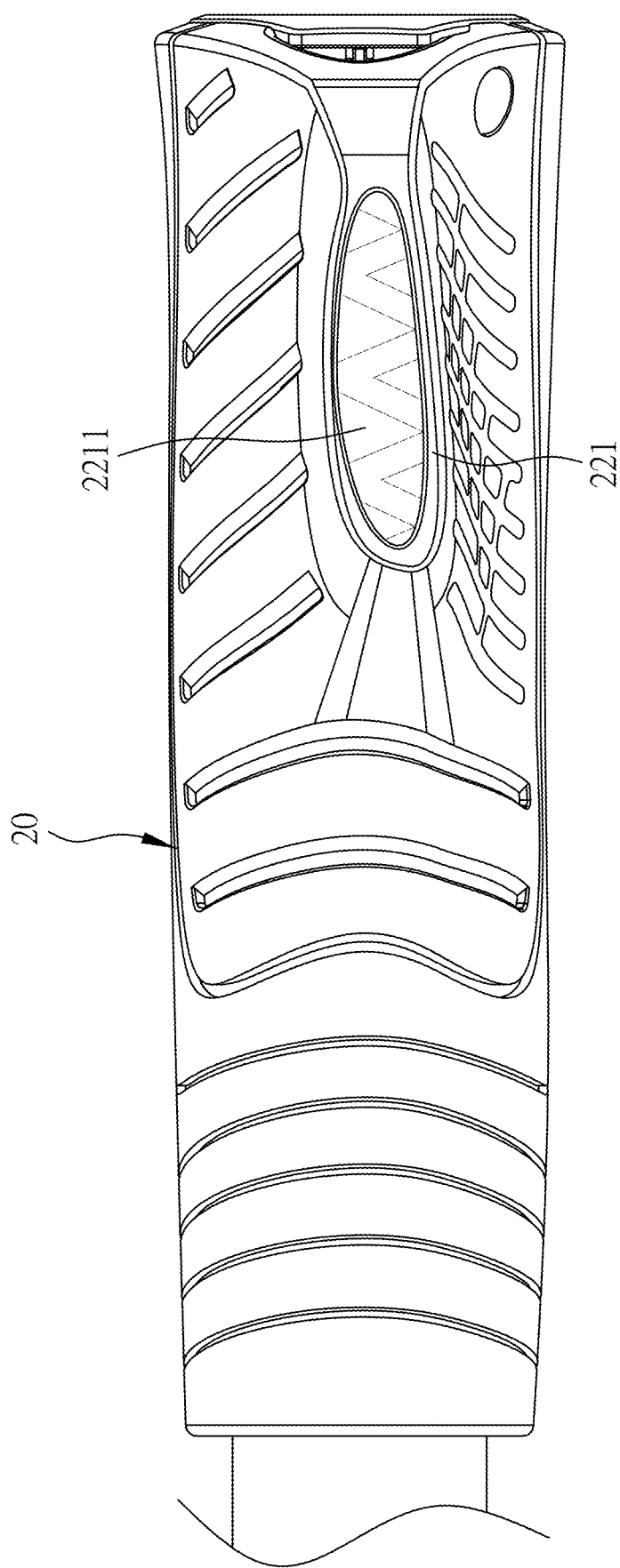
FIG. 20 is a side plan view showing the assembly of a through hole of a comfortable and pressure-reducing handle grip according to another preferred embodiment of the present invention.
Figure 21:
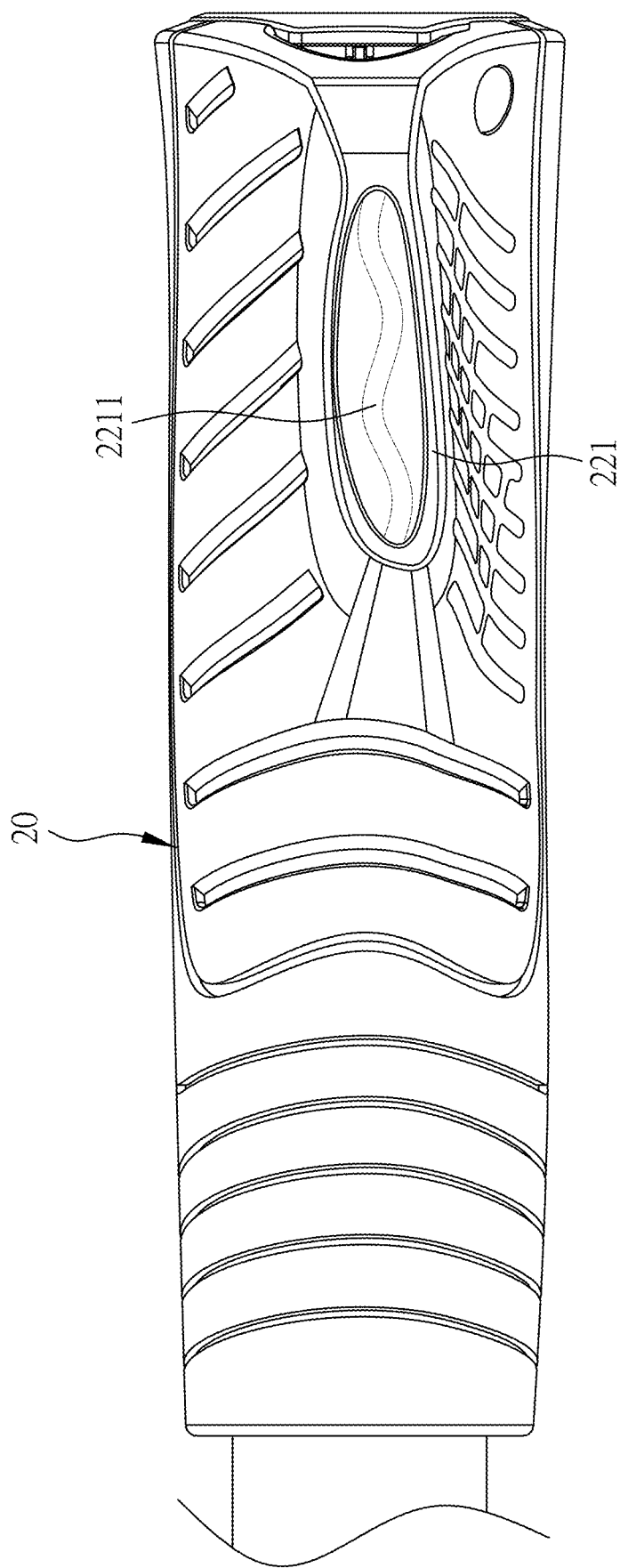
FIG. 21 is a side plan view showing the assembly of a through hole of a comfortable and pressure-reducing handle grip according to another preferred embodiment of the present invention.

The through hole 2211 of the sleeve 20 has multiple circular orifices as shown in FIG. 13. Alternatively, the through orifice 2211 is formed in a three-orifice shape as illustrated in FIG. 14. In another embodiment, the through orifice 2211 is formed in a two-orifice shape as shown in FIG. 15. With reference to FIG. 16, the through hole 2211 has multiple inclined orifices. Referring to FIG. 17, the through hole 2211 is in a diamond mesh shape. As shown in FIG. 18, the through hole 2211 is in a circular mesh shape. As illustrated in FIG. 19, the through hole 2211 is in a honeycomb shape. With reference to FIG. 20, the through hole 2211 is triangular. As shown in FIG. 21, the through hole 2211 is formed in a wave shape.

Figure 22:
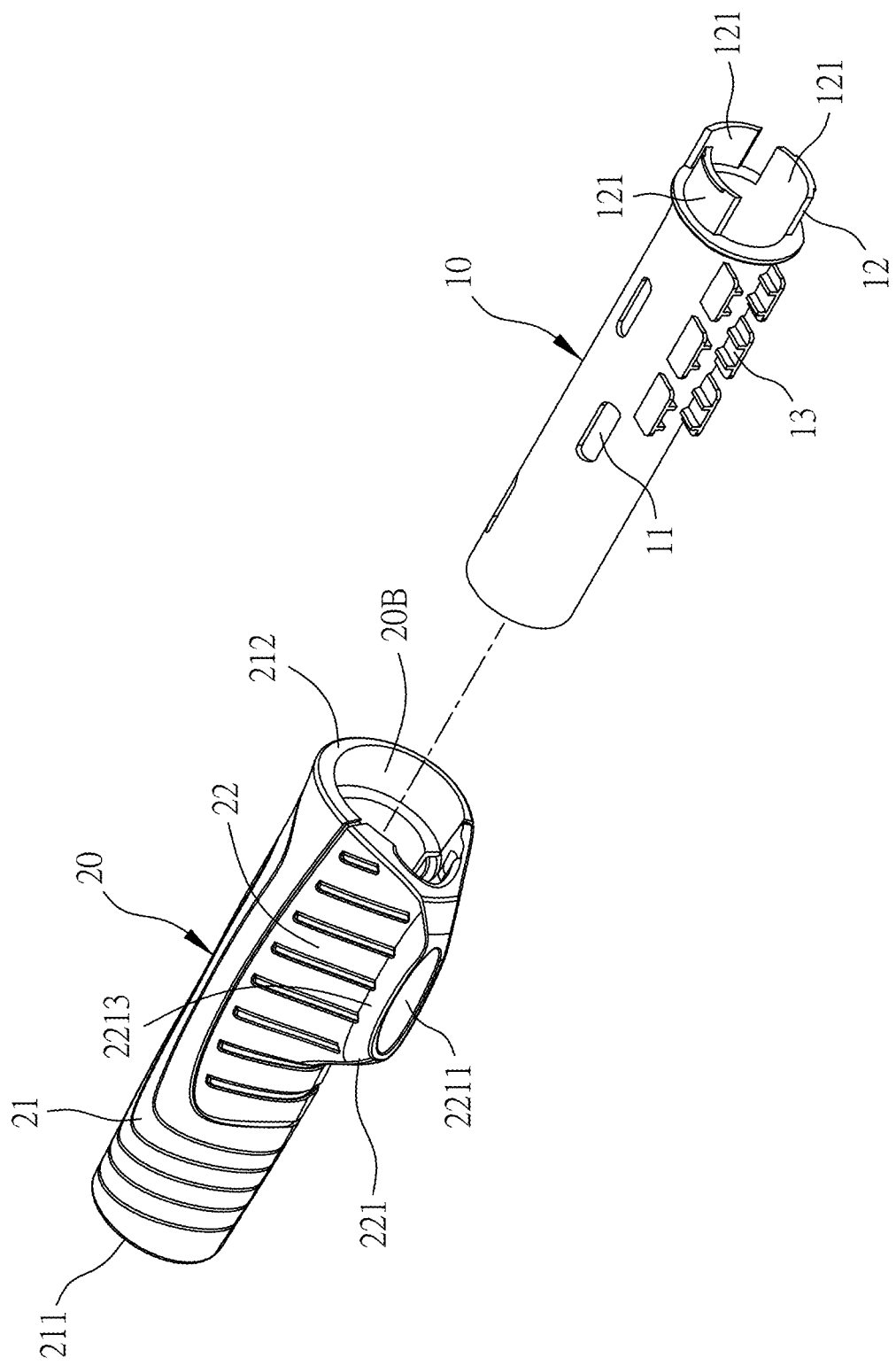
FIG. 22 is a perspective view showing the exploded components of a tube and a sleeve of a comfortable and pressure-reducing handle grip according to another preferred embodiment of the present invention.
Figure 23:
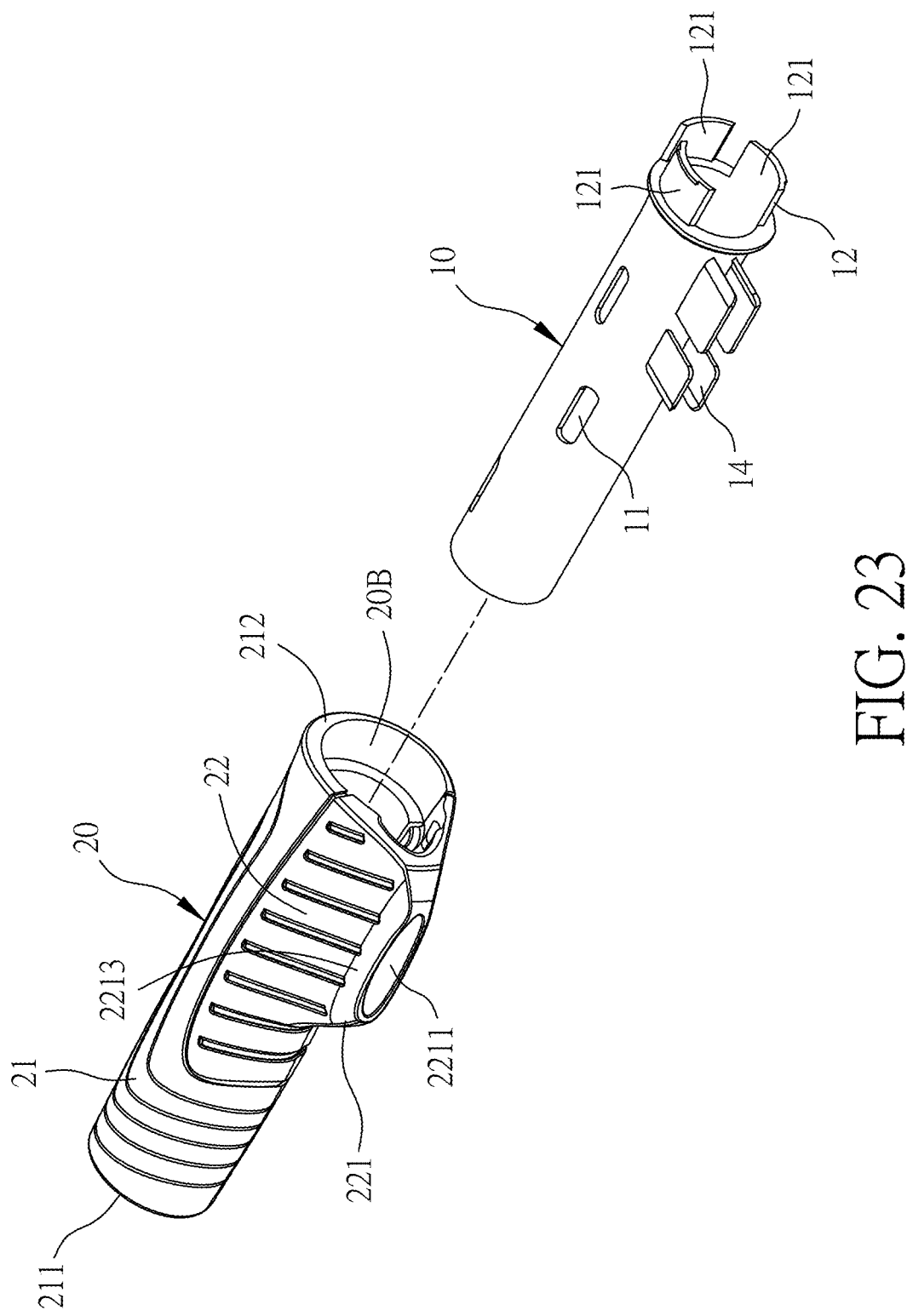
FIG. 23 is a perspective view showing the exploded components of a tube and a sleeve of a comfortable and pressure-reducing handle grip according to another preferred embodiment of the present invention.

With reference to FIG. 22, the tube 10 includes multiple fasteners 13 mounted on the outer wall thereof and configured to engage the tube 10 with the sleeve 20, thus connecting the tube 10 and the sleeve 20 securely. Referring to FIG. 23, the tube 10 includes multiple locking elements 14 fixed on the outer wall thereof and configured to engage the tube 10 with the sleeve 20.

Thereby, the comfortable and pressure-reducing handle grip has advantages as follows:

1) The comfortable and pressure-reducing handle grip is used comfortably and is capable of reducing pressure, for example, when using the comfortable and pressure-reducing handle grip, the through hole 2211 and the deformation block 221 are configured to be contacted by the palm of the rider to produce a flexible deformation thus obtaining an auxiliary support, a comfort, and a shock absorption.

2) The tube 10 of the comfortable and pressure-reducing handle grip includes the multiple spaced tabs 121, 121A of the tube 10, and the retainer 30 includes the multiple fixing recesses 31, 31A, such that the multiple fixing recesses 31, 31A are engaged with the multiple spaced tabs 121, 121A, thus avoiding the rotation of the retainer 30.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A comfortable and pressure-reducing handle grip comprising:
    a tube being hollow; and
    a sleeve injection molded and configured to cover an outer wall of the tube, wherein the sleeve includes a first gripping portion and a second gripping portion, the first gripping portion has an internal segment and an external segment, and the second gripping portion is located adjacent to a rear side of the external segment of the first gripping portion and is connected with the first gripping portion;
    wherein a hardness of the tube is greater than a hardness of the first gripping portion, and the hardness of the first gripping portion is greater than a hardness of the second gripping portion, wherein an X axis is defined in forward and backward directions of the second gripping portion, a Y axis is defined in left and right directions of the second gripping portion, and a Z axis is defined in up and down directions;
    wherein the second gripping portion has a deformation block extending along the X axis, the deformation block has a through hole defined along the X axis, and the deformation block has an air orifice formed along the Y axis and communicating with the through hole, wherein the deformation block has an abutting face defined on a top thereof, such that airs flow through the through hole of the X axis and the air orifice of the Y axis so that the deformation block flexibly deforms along the Z axis to enhance a using comfort and reduce a pressure.

2. The comfortable and pressure-reducing handle grip as claimed in claim 1 further comprises a retainer, wherein the tube includes a forced portion formed on an outer end thereof and having multiple spaced tabs, the sleeve includes a fitting groove defined on an inner wall thereof and corresponding to the forced portion of the tube, wherein the retainer includes multiple fixing recesses defined on an inner surface and an outer surface thereof, and the retainer is fitted in the fitting groove of the sleeve and on the forced portion of the tube to retain the tube on the handlebar, and the multiple fixing recesses of the retainer are engaged with the multiple spaced tabs of the tube to avoid an offset when the retainer rotates.

3. The comfortable and pressure-reducing handle grip as claimed in claim 2 further comprises a covering element, wherein the covering element includes a cap and an engagement portion configured to engage with an inner wall of the handlebar, wherein the cap is covered on the fitting groove of the sleeve to accommodate the retainer in the sleeve.

4. The comfortable and pressure-reducing handle grip as claimed in claim 1 further comprises a retainer, wherein the tube includes a forced portion formed on an inner end thereof and having two spaced tabs, wherein the forced portion of the tube extends out of the sleeve, and the retainer includes two fixing recesses defined on an inner surface thereof, the retainer is fitted on the forced portion of the tube to retain the tube on the handlebar, and the multiple fixing recesses of the retainer are engaged with the multiple spaced tabs of the tube to avoid a rotation of the retainer.

5. The comfortable and pressure-reducing handle grip as claimed in claim 1, wherein the tube includes multiple receiving orifices defined on the outer wall of the tube, and the sleeve includes multiple engagement protrusions formed on an inner wall thereof and engaged in the multiple receiving orifices of the tube.

6. The comfortable and pressure-reducing handle grip as claimed in claim 1, wherein the tube includes multiple fasteners mounted on the outer wall thereof and configured to engage the tube with the sleeve, thus connecting the tube and the sleeve securely.

* * * * *